US006931702B2

(12) United States Patent
Mitsuhashi et al.

(10) Patent No.: US 6,931,702 B2
(45) Date of Patent: Aug. 23, 2005

(54) INKJET RECORDING HEAD AND METHOD FOR MANUFACTURING THE SAME

(75) Inventors: Masashige Mitsuhashi, Tokyo (JP); Shigeru Umehara, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 89 days.

(21) Appl. No.: 10/721,240

(22) Filed: Nov. 26, 2003

(65) Prior Publication Data

US 2004/0104977 A1 Jun. 3, 2004

Related U.S. Application Data

(62) Division of application No. 10/155,075, filed on May 28, 2002, now Pat. No. 6,688,732.

(30) Foreign Application Priority Data

May 28, 2001 (JP) ...................................... 2001-158185
Sep. 20, 2001 (JP) ...................................... 2001-287357

(51) Int. Cl.[7] .......................... H04R 17/00; B41J 2/045; B32B 3/00; G11B 5/127

(52) U.S. Cl. ....................... 29/25.35; 29/890.1; 29/830; 29/831; 347/70; 156/153; 216/27

(58) Field of Search ............................ 29/25.35, 890.1, 29/830, 831; 347/68, 69, 70, 71, 72; 156/153, 154, 344, 292, 277; 216/27

(56) References Cited

U.S. PATENT DOCUMENTS 5,071,792 A * 12/1991 VanVonno et al. ............ 438/17
5,101,285 A * 3/1992 Kawai et al. ............... 358/471
5,922,218 A * 7/1999 Miyata et al. ................ 216/27
6,142,615 A * 11/2000 Qiu et al. ...................... 347/70
6,241,340 B1 * 6/2001 Watanabe et al. ............. 347/50
6,332,672 B1 12/2001 Yazaki et al.

FOREIGN PATENT DOCUMENTS

| | | |
|---|---|---|
| JP | 56-064877 | 6/1981 |
| JP | 06-143563 | 5/1994 |
| JP | 09-039234 | 2/1997 |
| JP | 11-129476 | 5/1999 |
| JP | 11-207970 | 8/1999 |
| JP | 2000-079686 | 3/2000 |
| JP | 2001-088303 | 4/2001 |
| JP | 2000-289200 | 10/2001 |

* cited by examiner

*Primary Examiner*—A. Dexter Tugbang
*Assistant Examiner*—Tai Van Nguyen
(74) *Attorney, Agent, or Firm*—McGinn & Gibb, PLLC

(57) ABSTRACT

An inkjet recording head includes a two-dimensional array of a pressure chambers and corresponding array of piezoelectric elements each for applying a pressure wave to ink in a corresponding pressure chamber. In fabrication, a piezoelectric plate temporarily bonded onto a substrate is subjected to sandblasting to form the plurality of piezoelectric elements After the piezoelectric elements are bonded as a unit onto a diaphragm which constitutes part of the walls of the pressure chambers, the substrate is removed. Dummy patterns equalize the degree of side etching among the piezoelectric elements.

22 Claims, 10 Drawing Sheets

INKJET RECORDING HEAD AND METHOD FOR MANUFACTURING THE SAME

The present Application is a Divisional Application of U.S. patent application Ser. No. 10/155,075, filed on May 28,2002 now U.S. Pat. No. 6,688,732.

BACKGROUND OF THE INVENTION

1. Field of the Invention

The present invention relates to an inkjet recording head, which is capable of incorporation into information equipment such as a word processor, facsimile, and printer, a method for manufacturing the same, and an inkjet recording device. In particular, the present invention relates to an inkjet recording head configured to allow high-density arrangement in a two-dimensional array of piezoelectric elements and facilitate mass production thereof, a method for manufacturing such an ink-jet recording head, and an inkjet recording device having such an inkjet recording head.

2. Description of the Related Art

In recent years, an impact recording process has attracted much attention for its small noise in recording and a high recording speed thereof. Among other impact recording processes, an inkjet recording process used in inkjet printers has been in wide use. The inkjet printer allows ink droplets to be ejected from the recording head and attached onto recording paper so that characters, figures and photographs are printed at a high speed. The inkjet printer is capable of recording the images onto plain paper without using a special fixation processing. According to a known inkjet recording process called drop-on-demand inkjet recording scheme, an electro-mechanical transducer such as a piezoelectric actuator is used to generate pressure waves (acoustic waves) in pressure chambers filled with ink, thereby allowing ink droplets to be ejected from the nozzles disposed in communication with the pressure chambers.

An inkjet recording head using the drop-on-demand inkjet scheme is described in JP Patent Publication No. Sho 56-64877. FIGS. 1A to 1C show the conventional inkjet recording head described in the publication. FIG. 1A is a longitudinal sectional view of the essential parts of the inkjet recording head, FIG. 1B a partially-broken top plan view thereof, and FIG. 1C a sectional view taken along the line c—c of FIG. 1B.

The inkjet recording head described in the publication has a base plate 44 and a diaphragm 42 which are coupled together to form a plurality of pressure chambers 45 therebetween. An ink nozzle, or orifice 43, is formed at one end of each pressure chamber 45. A plurality of rectangular piezoelectric elements 41 are mounted on the diaphragm 42 corresponding to the respective, pressure chambers 45. The piezoelectric elements 41 are electrically connected to a pulse generator 40. The pressure chamber 45 is supplied with ink from an ink reservoir 47 through an ink supply tube 46. The piezoelectric elements 41 are made of piezoelectric ceramic, and more particularly, PZT (lead zirconate titanate).

In the conventional inkjet recording head as described above, the piezoelectric elements 41 are manufactured by machining a piezoelectric ceramic plate to configure predetermined size and shape. Examples of he method for machining the piezoelectric elements 41 with high precision include a dicing saw technique such as for cutting or trenching by using the rotation of a disc containing diamond particles (dicing blade), and a wire saw technique. These high-precision machining methods for piezoelectric elements, although suited to linear machining, are incapable of working the piezoelectric ceramic plate (piezoelectric plate) into arbitrary shapes.

An example of a manufacturing method for forming a piezoelectric plate into an arbitrary shape is described in JP Patent Laid-Open Publication No. Hei 11-207970. The manufacturing method described in this publication is as follows. Initially, a sheet of foaming agent is bonded onto a dummy glass plate, and a piezoelectric film is laminated thereon. A resist is applied thereon and patterned for mask portions. Thereafter, the piezoelectric film is subjected to cutting by sandblasting at regions other than those covered by the mask portions. Subsequently, the resist is removed. The resultant piezoelectric plates are subjected to positioning onto the ink reservoirs and placed on a conductive film formed on the diaphragm before the dummy glass plate is removed. Then, electrodes are mounted on the piezoelectric film to obtain the inkjet recording head. Using the manufacturing method described in the publication, the piezoelectric film can be formed into arbitrary shapes according to the mask pattern.

In the field of the inkjet recording heads, such an ink-jet recording head having a two-dimensional array of a number of nozzles (hereinafter, this type of the inkjet recording head is referred to as a matrix head) is expected as the next-generation head in view of the high-density nozzle arrangement with suppressed increase in the head size. The technique described in the publication relates to an inkjet recording head having a plurality of piezoelectric elements arranged only in one dimension. It is silent as to the provision of a number of piezoelectric elements arranged in a two dimensional array at a high density to form a matrix head.

SUMMARY OF THE INVENTION

In view of the foregoing, it is an object of the present invention to provide a method for manufacturing an ink-jet recording head by which a piezoelectric plate can be formed into arbitrary shapes and arranged at a high-density, i.e., in two-dimensional array of a number of piezoelectric elements as a matrix head, and which can be manufactured by simple manufacturing processes.

It is another object of the present invention to provide an inkjet recording head manufactured by such a manufacturing method, and an inkjet recording device incorporating such an inkjet recording head.

To achieve the foregoing objects, the present invention provides, in a first aspect thereof, a method for manufacturing an inkjet recording head which includes a two-dimensional array of a plurality of pressure chambers each communicating with a common ink reservoir, at least one diaphragm constituting part of walls of the pressure chambers, and a plurality of piezoelectric elements coupled to the diaphragm so as to correspond to the pressure chambers, the piezoelectric elements being activated to apply a pressure wave to ink in the pressure chambers so that ink droplets are ejected from nozzles which communicates with the respective pressure chambers.

A preferred embodiment of the method of the first aspect of the present invention includes the steps of: temporarily bonding a piezoelectric plate onto a substrate for allowing the substrate to be released from the piezoelectric plate; affixing a mask film onto the piezoelectric plate; patterning the mask film into a piezoelectric element mask pattern; subjecting the piezoelectric plate to sandblasting from above the piezoelectric element mask pattern to form a piezoelectric element array including a plurality of piezoelectric elements arranged in a two-dimensional array on the substrate; bonding the piezoelectric elements of the piezoelectric element array as a unit onto the diaphragm; and removing the substrate from the piezoelectric elements after the sandblasting.

The term "piezoelectric plate" as used in this text means a plate of a piezoelectric material such as a piezoelectric ceramic to be configured into a plurality of piezoelectric elements.

According to the method of the first aspect of the present invention, the piezoelectric plate can be cut into arbitrary shapes with ease to facilitate provision of a number of piezoelectric elements each releasable from the substrate. In addition, since the plurality of piezoelectric elements can be formed on the substrate as a piezoelectric element array having a two-dimensional arrangement, a high-density and two-dimensional array of a number of piezoelectric elements can be easily manufactured to form a matrix head.

The piezoelectric plate is preferably patterned by sandblasting. The patterning of the piezoelectric plate by using the sandblasting technique allows the piezoelectric elements to be formed on the diaphragm with ease irrespective of the number and arrangement of piezoelectric elements.

JP Patent Laid-Open Publications Nos. Hei 11-129476, 2001-88303, and 2000-79686 describe respective techniques for transferring a plurality of piezoelectric elements formed in block. However, all of these techniques are to form a plurality of piezoelectric elements on the substrate by using photolithography, screen printing, and the like, not the sandblasting. In contrast, according to the manufacturing method of the present invention, the plurality of piezoelectric elements formed on the substrate by patterning suing the sandblasting can be handled altogether as a unit of the piezoelectric elements. Consequently, despite the use of relatively inexpensive apparatuses, the step of forming a number of piezoelectric elements and the step of bonding the piezoelectric elements to the walls of the respective pressure chambers are both facilitated. Hence, the manufacturing method of the first aspect of the present invention simplifies the manufacturing processes and facilitates the mass production of matrix heads each having a number of piezoelectric elements arranged at a high density.

A method for manufacturing an inkjet recording head according to a second aspect of the present invention is applied to manufacturing an inkjet recording head of the type as described above.

A preferred embodiment of the method of the second aspect of the present invention includes the steps of: affixing a mask film onto a piezoelectric plate; forming the mask film into a pattern mask including a piezoelectric element mask pattern and a peripheral dummy mask pattern surrounding the piezoelectric element mask pattern; and applying sandblasting from above the pattern mask to pattern the piezoelectric plate based on the piezoelectric element mask pattern and the peripheral mask pattern.

The method for manufacturing an inkjet recording head in the second aspect of the present invention achieves effects similar to the effects of the method of the first aspect of the present invention. In addition, the peripheral dummy pattern formed in the peripheral area of the piezoelectric element array can suppress the side etching that occurs during the sandblasting, thereby assuring high dimensional uniformity of the piezoelectric elements.

More specifically, after the piezoelectric plate is subjected to sandblasting, the sandblast processing (etching) in the thickness-wise direction of the piezoelectric plate is accompanied by the processing in the width-wise direction of the piezoelectric plate, i.e., side etching. The side etching occurs due to the collision of blasting particles with the side surfaces of the piezoelectric plates in the sandblasting processing.

The rate of processing in the side etching in general depends on the widths of the processed trenches to be formed in the piezoelectric plate. That is, a larger width of the trenches to be formed along the piezoelectric elements increases the probability for blasting particles to collide with the sides of the piezoelectric plate. As a result, the side etching proceeds at a higher rate at the periphery. Due to this property of the sandblasting processing, the piezoelectric elements formed at the periphery of the piezoelectric element array suffer from higher side etching. That is, since the outer peripheries of the peripheral piezoelectric elements are not associated with the elements that protect the peripheral piezoelectric elements against the collision of blast particles onto the side surfaces, the side etching proceeds at a higher rate. As a result, the peripheral piezoelectric elements may be deteriorated in the dimensional accuracy. Since the sizes of the piezoelectric elements have a significant influence on the ejection characteristics such as droplet volume, droplet speed, etc., ununiform side etching among the piezoelectric elements as described above must be assured.

For this reason, in the method for manufacturing an ink-jet recording head of the second aspect of the present invention, the peripheral dummy pattern is arranged so as to surround the piezoelectric element array. Consequently, the peripheral dummy pattern protects the peripheral piezoelectric elements against the side etching, thereby allowing the formation of a piezoelectric element array having high dimensional uniformity.

It is to be noted that JP Patent Laid-Open Publications Nos.

Hei 9-39234, Hei 6-143563, and 2000-289200 describe techniques for forming dummy piezoelectric elements, which are irrelevant to the function of application of the pressure to the pressure chambers. The techniques described in these publications are, however, intended only to improve mechanical strength, wherein a base or the like mounting thereon the piezoelectric elements is coupled to the diaphragm. Thus, the foregoing advantages of the present invention such as "fabricating well-cut piezoelectric elements" cannot be expected from them.

Prior to the step of affixing the mask film, the piezoelectric plate is preferably bonded onto the substrate for allowing the substrate to be released from the piezoelectric plate. The piezoelectric element array having a two-dimensional array of a plurality of piezoelectric elements arranged on the substrate is then formed, and the piezoelectric elements of the piezoelectric element array are bonded onto the diaphragm before the substrate is removed from the piezoelectric elements. In this step, the plurality of piezoelectric elements formed on the substrate by the sandblasting can be handled altogether as a unit. Consequently, the step of forming a number of piezoelectric elements and the step of bonding the piezoelectric elements onto the walls of the respective pressure chambers are both facilitated. Hence, the manufacturing method of the second aspect of the present invention simplifies the manufacturing processes and facilitates the mass production of matrix heads having a number of piezoelectric elements arranged at a higher density.

A method for manufacturing an inkjet recording head according to a third aspect of the present invention is applied to manufacturing the inkjet recording head as described above.

A preferred embodiment of the method of the third aspect of the present invention includes the steps of: affixing a mask film onto a piezoelectric plate; forming the mask film into a pattern mask including a plurality of piezoelectric element mask patterns and a dummy pattern disposed within a gap between each two column of the piezoelectric element mask patterns; and subjecting the piezoelectric plate to sandblasting from above the pattern mask.

In accordance with the method of the third aspect of the present invention, the dimensions of the piezoelectric elements have further improved uniformity by reducing the side etching effected at the respective sides of the piezoelectric elements.

In the third aspect, prior to the step of affixing the mask film, the piezoelectric plate is preferably bonded onto the substrate for allowing removal of the piezoelectric plate from the substrate.

In addition, the peripheral dummy pattern described in the manufacturing method according to the second aspect of the present invention may be used in the manufacturing method of the third aspect, in addition to the dummy pattern in the third aspect.

An inkjet recording head according to the present invention includes: a two-dimensional array of a plurality of pressure chambers each communicating with an ink reservoir; a diaphragm constituting part of walls of the pressure chambers; and a plurality of piezoelectric elements coupled to the diaphragm so as to correspond to the pressure chambers, the piezoelectric elements being activated to apply a pressure wave to ink in the pressure chambers so that ink droplets are ejected from nozzles communicating with the respective pressure chambers. In the structure, insulating resin films are formed on sides of the respective piezoelectric elements.

In the structure of the inkjet recording head according to the present invention, a two-dimensional array of piezoelectric elements arranged at high density is formed, with the insulating resin films formed on the sides of the piezoelectric elements. The insulating resin film protects the piezoelectric elements against a damage caused by dielectric breakdown of the piezoelectric elements which may occur due to absorption of moisture from the air, with an improvement in reliability.

In an inkjet recording head according to a first example of the present invention, the piezoelectric elements are arranged in a two-dimensional array on the diaphragm constituting the walls of the pressure chambers, with a peripheral dummy pattern being disposed around the piezoelectric elements.

According to the inkjet recording head of the first example of the present invention, the peripheral dummy pattern formed around the two-dimensional array of the piezoelectric elements is subjected to sandblasting thereby protecting the sides of the peripheral piezoelectric elements against the side etching. The piezoelectric elements have excellent uniformity of dimensions due to the function of the dummy pattern during the sandblasting.

In an inkjet recording head according to a second example of the present invention, intervening dummy patterns are disposed between each adjacent two of the piezoelectric elements.

According to the inkjet recording head of the second example of the present invention, all the piezoelectric elements in the piezoelectric element array are subjected to uniform side etching during the sandblasting step. Thus, the resultant piezoelectric elements have excellent uniformity in dimensions thereof due to the function of the intervening dummy pattern during the sandblasting.

In an inkjet recording head according to a third example of the present invention, the pressure chamber plate defining the pressure chambers has at least one positioning mark, the diaphragm has a through-hole positioned with respect to the positioning mark, and a piezoelectric plate on which the plurality of piezoelectric elements are formed has an alignment mark.

According to the inkjet recording head in the third example of the present invention, the pressure chambers and the piezoelectric elements can be aligned with each other with high accuracy by using the through-hole of the diaphragm.

An inkjet recording device according to the present invention includes any of the foregoing inkjet recording heads. It is possible to obtain an inkjet recording device which has piezoelectric elements of extremely high uniformity in shape, suppresses characteristic variances between ejectors, and is capable of outputting high-quality image signal.

The above and other objects, features and advantages of the present invention will be more apparent from the following description, referring to the accompanying drawings.

DETAILED DESCRIPTION OF THE PREFERRED EMBODIMENTS

Figure 1A:
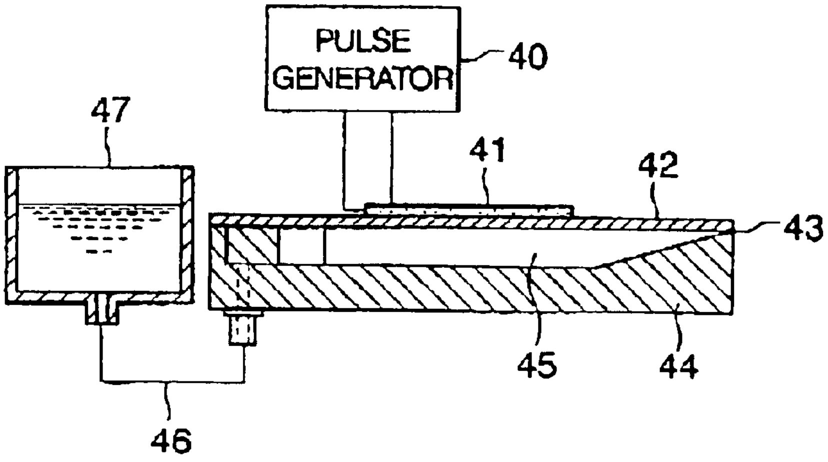
FIG. 1A RELATED ART
FIGS. 1A–1C show a conventional inkjet recording head, FIG. 1A being a longitudinal sectional view of the essential parts thereof, FIG. 1B a partially-broken top plan view thereof, FIG. 1C a sectional view taken along the line c—c of FIG. 1B.

In a preferred embodiment of the present invention, the process for manufacturing an inkjet recording head includes the step of forming at least one alignment mark for positioning the piezoelectric elements of the piezoelectric element array with respect to the diaphragm. The mark may be formed on the substrate and/or the piezoelectric plate in the step of sandblasting.

In the step for forming the marks, for example, first through-holes are formed in the substrate, second through-holes are formed in the diaphragm constituting the walls of the pressure chambers, and positioning marks are formed on the pressure chamber plate having therein the pressure chambers. In the step of forming the piezoelectric element array, alignment marks and two-dimensional array isolation trenches are simultaneously formed in the piezoelectric plate by the sandblasting, wherein the alignment marks are substantially consistent with the positions of the first through holes and smaller in size than the first through holes. The two-dimensional array isolation trenches isolate the piezoelectric elements from one another. With reference to the alignment marks, the piezoelectric elements on the pressure chamber plate are coupled to the diaphragm while positioning among the first through holes, the alignment marks, the second through holes, and the positioning marks. In this case, the first through holes greater than the alignment marks and formed in the substrate in accordance with the pitch of the alignment marks facilitates positioning from the rear side of the substrate.

It is also preferable in the present invention that the pressure chambers have walls defined by the diaphragm, and that the diaphragm be provided in advance with positioning marks to be used as the reference in the step of coupling the diaphragm to the piezoelectric element array. Openings for use in optical alignment with respect to the positioning marks are then formed in the substrate in the step of sandblasting. In this case, the openings which are necessary in the subsequent steps can be formed in the step of patterning for isolating the piezoelectric elements, such as the sandblasting. This suppresses variances in alignment accuracy from accumulating, and allows the piezoelectric elements to be accurately positioned and coupled as a unit to the diaphragm corresponding to the pressure chambers with high accuracy.

More preferably, the piezoelectric plate is bonded onto the substrate by means of a heat-foaming adhesive film. Before the step of removing the substrate from the piezoelectric element array, the substrate is heated to reduce adhesive strength of the heat-foaming adhesive film. This significantly facilitates the step of bonding the piezoelectric element array and the substrate together and the step of removing the substrate bonded.

It is also preferable that a step of forming insulating resin films on the sides of the respective piezoelectric elements by evaporation be interposed between the step of forming the piezoelectric element array and the step of bonding the piezoelectric elements onto the diaphragm. In the evaporation step, the substrate having the piezoelectric element array coated with the mask film is inclined at a predetermined angle from a vertical direction and revolved around an evaporation source. In this case, the insulating resin films can be formed on the sides of the respective piezoelectric elements with excellent uniformity. The insulating resin films on the sides of the piezoelectric elements can assuredly prevent the piezoelectric elements from being damaged by the dielectric breakdown which may occur due to absorption of moisture from the air, thereby improving the reliability.

The piezoelectric element array and the diaphragm are preferably bonded onto the walls of the pressure chambers with a conductive adhesive. If the piezoelectric elements have metal thin films on their respective surfaces in contact with the pressure chamber walls, the piezoelectric elements having the metallic thin films can be securely fixed onto the walls of the pressure chambers without impairing suitable electric conductivity.

The step of sandblasting is preferably performed for a time interval longer than the minimum normal processing period which is generally required depending on the thickness of the piezoelectric plate. For example, the sandblasting may be performed for a time interval two to four times the minimum normal processing period for penetrating the piezoelectric plate. This sandblasting step isolates the piezoelectric elements from one another, with isolation trenches of uniform shape being disposed between adjacent two of them, to obtain a piezoelectric element array having an excellent configuration for the two-dimensional array.

The step of sandblasting may form isolation trenches of a substantially uniform width extending in row and column directions to isolate the piezoelectric elements from one another. In this case, the isolation trenches obtained by the sandblasting step have a uniform sectional shape.

The piezoelectric elements are preferably coupled to the pressure chambers, with one of the ends each piezoelectric elements being positioned above walls of the pressure chambers, and with the other of the ends thereof being positioned above the internals of the pressure chambers. The piezoelectric elements can thus be fixed onto the diaphragm of the pressure chamber unit at one end, so that they can expand and contract to cause displacements of the diaphragm above the openings.

More preferably, a flexible wiring board is mechanically and electrically connected to surfaces of the piezoelectric elements disposed above the walls of the pressure chambers by means of solder bumps. In this step, the solder bumps establish connection between the flexible wiring board and the surfaces of the piezoelectric elements positioned and coupled above the walls of the pressure chambers. It is therefore possible to increase the pressure in the solder bump connection, thereby allowing an improved bonding strength. In addition, since the solder bumps can be connected to a control unit through the flexible wiring board, the connections can be surely established even if the solder bumps have variances in the height thereof.

Figure 2:
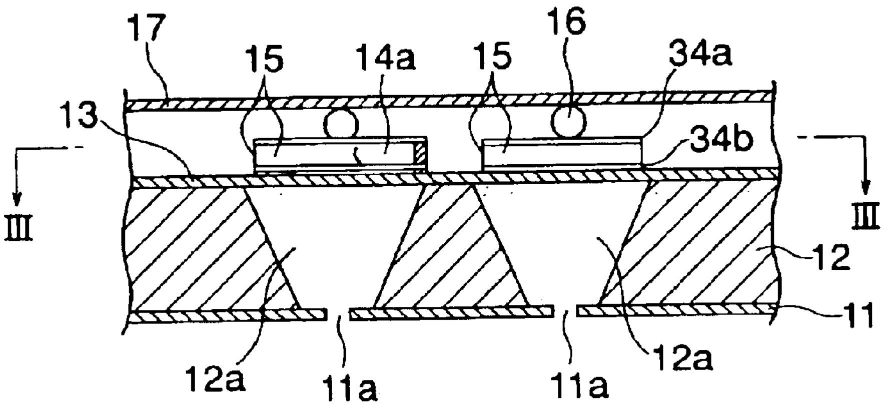
FIG. 2 is a sectional view showing the configuration of the essential parts of an inkjet recording head according to a first embodiment of the present invention.

Hereinafter, the present invention will be further detailed in conjunction with preferred embodiments thereof with reference to the drawings. FIG. 2 is a sectional view showing the essential parts of an inkjet recording head according to a first embodiment of the present invention.

First Embodiment

The present embodiment is directed to an example of an inkjet recording head that includes piezoelectric elements having the same square shapes as the shapes of pressure chambers. The inkjet recording head has a nozzle plate 11 in which a plurality of nozzles 11*a* are formed in a two dimensional array. On this nozzle plate 11 are arranged a pressure chamber plate 12 and a diaphragm 13. The pressure chamber plate 12 defines a plurality of pressure chambers

12*a* each communicating with a corresponding one of the nozzles 11*a*. The diaphragm 13 is bonded so as to oppose the interior of the pressure chambers 12*a* at one surface of the diaphragm and constitute the top walls of the pressure chambers 12*a*.

A plurality of piezoelectric elements 14*a* are arranged on the other surface of the diaphragm 13, far from the pressure chambers 12*a*, in a two-dimensional array so as to oppose the respective pressure chambers 12*a*. The piezoelectric elements 14*a* have insulating resin films 15 formed on the side surfaces thereof, and first and second electrode layers 34*a* and 34*b* formed on the top and bottom surfaces thereof, respectively. The pressure chambers 12*a* have the shape of a substantially quadrangular pyramid, having smaller sectional area as viewed from the side of the diaphragm 13 toward the respective nozzles 11*a*. In each piezoelectric element 14*a*, the first electrode layer 34*a* is mechanically and electrically connected to a wiring layer 17 via solder ball bumps 16, and the second electrode layer 34*b* is bonded onto the diaphragm 13 with a conductive adhesive. The piezoelectric elements 14*a* receive a drive voltage from a control unit (not shown) through the wiring layer 17 and the solder ball bumps 16.

Figure 3:
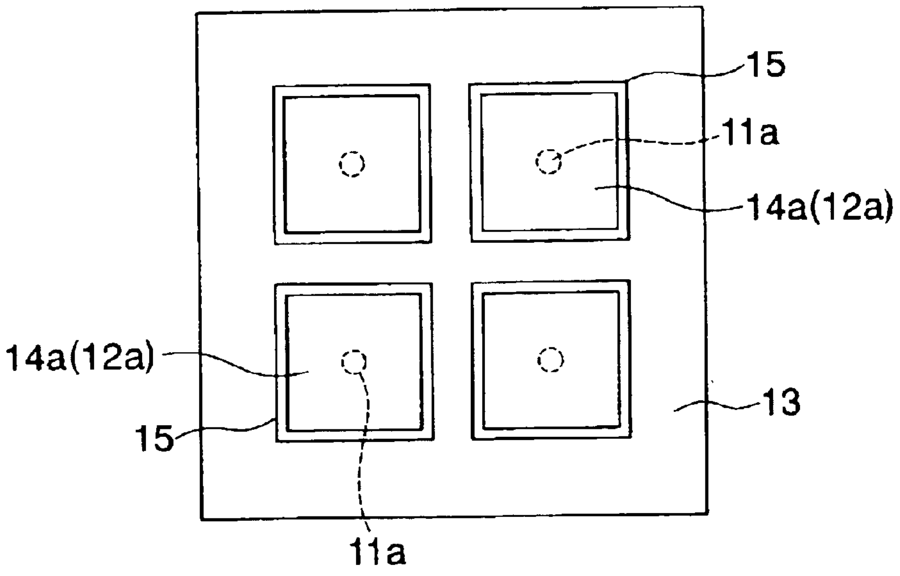
FIG. 3 is a top plan view taken along line III—III of FIG. 2, showing the physical relationship between pluralities of square piezoelectric elements and nozzles arranged in a two dimensional array in the first embodiment.

Referring to FIG. 3 taken along line III—III of FIG. 2, there is shown the physical relationship between the pluralities of piezoelectric elements 14*a* and nozzles 11*a* arranged in a two dimensional array. The plurality of nozzles 11*a* are arranged in a matrix on the nozzle plate 11. The plurality of piezoelectric elements 14*a* opposed to these nozzles 11*a* are arranged in a matrix on the diaphragm 13. The piezoelectric elements 14*a* have a square shape, and are positioned with respect to the nozzles 11*a* at the centers of the insulating resin films 15 formed on the respective four sides of the piezoelectric elements 14*a*.

Figure 4:
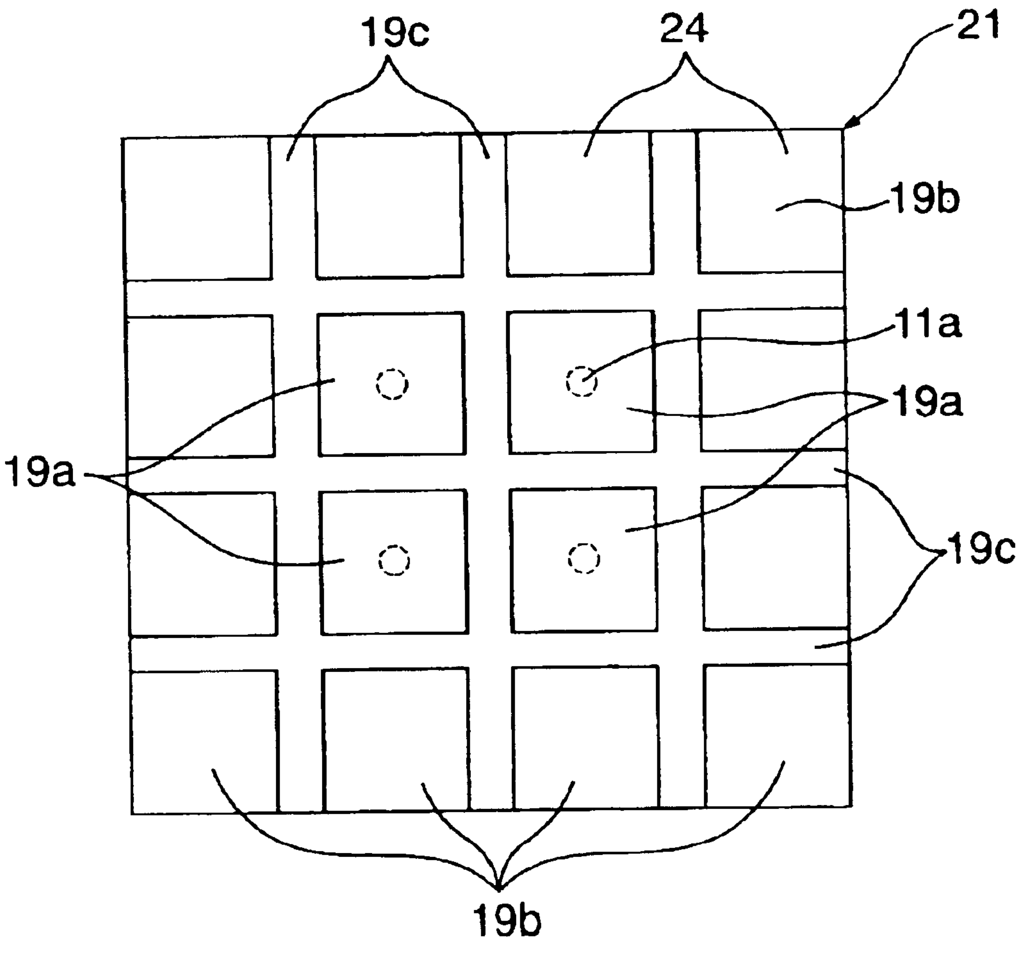
FIG. 4 is a schematic diagram showing the configuration of a piezoelectric element pattern in the first embodiment.

Now, a method for manufacturing the inkjet recording head having the foregoing configuration will be described hereinafter. Initially, to fabricate piezoelectric elements 14*a*, a rectangular sheet of piezoelectric plate 21 is prepared as shown in FIG. 4. A piezoelectric element mask pattern and a peripheral dummy mask pattern are formed on the piezoelectric plate 21. FIG. 4 schematically shows the structure of the piezoelectric plate after the sandblasting step including the piezoelectric element pattern and the peripheral dummy pattern formed by using the piezoelectric element mask pattern and the peripheral dummy mask pattern, respectively.

In the pattern forming step as described above, a photosensitive film 24 is initially bonded onto the whole surface of the piezoelectric plate 21. The photosensitive film 24 is then covered with a grid mask (not shown) for exposure and development. The cells of the photosensitive film 24 cured and left by the development constitute the piezoelectric element mask pattern for forming a piezoelectric element pattern 19*a* and the peripheral dummy mask pattern for forming a peripheral dummy pattern 19*b* which surrounds the piezoelectric element pattern 19*a*. The regions that are not covered under the pattern mask including the piezoelectric element mask pattern and the peripheral dummy mask pattern are removed to form a trench pattern 19*c* which extends in row and column directions.

Figure 5A:
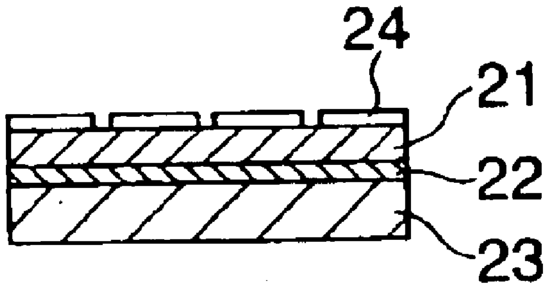
FIGS. 5A and 5B are sectional views showing the configuration of the piezoelectric plate at different stages in the first embodiment, FIG. 5A showing the state of FIG. 4 where the piezoelectric element pattern is formed, FIG. 5B the piezoelectric plate of FIG. 5A after the sandblasting.
Figure 5B:
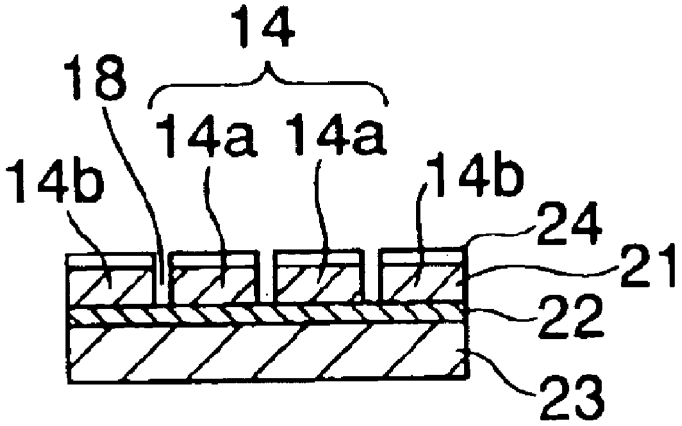

FIGS. 5A and 5B show the configuration of the piezoelectric plate at different stages. FIG. 5A is a sectional side view corresponding to the step of FIG. 4 where the piezoelectric element pattern is formed. FIG. 5B is a sectional side view showing the piezoelectric plate of FIG. 5A after sandblasting.

In FIG. 5A, the piezoelectric plate 21 is bonded and fixed at one side thereof onto a flat substrate 23 via a heat-foaming adhesive film 22. On the other side of the piezoelectric plate 21, the photosensitive film 24 shown in FIG. 4 is formed including the piezoelectric element mask pattern and the peripheral dummy mask pattern for forming the piezoelectric element pattern 19*a* and the peripheral dummy pattern 19*b*, respectively. The heat-foaming adhesive film 22 has the property of foaming with a significant drop in adhesive strength when heated up to a predetermined temperature after the bonding.

FIG. 5B shows the step after the sandblasting is preformed from above the photosensitive film 24 by blowing fine abrasives while using an abrasive blasting equipment (not shown). The piezoelectric plate 21 bonded and fixed onto the substrate 23 is ground based on the piezoelectric element mask pattern and the peripheral dummy mask pattern, whereby piezoelectric elements 14*a* and dummy elements 14*b* isolated from one another with isolation trenches 18 are obtained. The provision of the peripheral dummy pattern 19*b* in FIG. 4 can suppress side etching which tends to occur in the peripheral piezoelectric elements 14*a*. Thus, the piezoelectric elements 14*a* having uniform size and shape are obtained in the two-dimensional array. Although the shown example contains four piezoelectric element patterns 19*a* as well as twelve dummy element patterns 19*b* surrounding the piezoelectric element pattern array which consists of the four piezoelectric element patterns 19*a*, the numbers of these patterns in the present invention are not limited thereto.

Figure 6A:
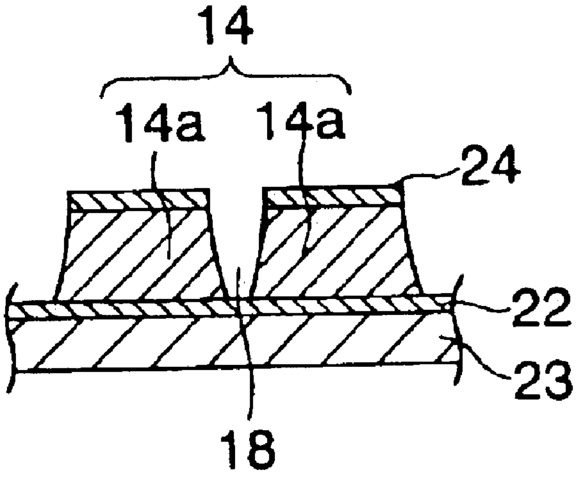
FIGS. 6A and 6B are sectional views showing piezoelectric element arrays formed by sandblasting in the first embodiment, FIG. 6A showing the resultant of sandblasting for a normal period, FIG. 6B the resultant of sandblasting for a time interval three times the normal period.
Figure 6B:
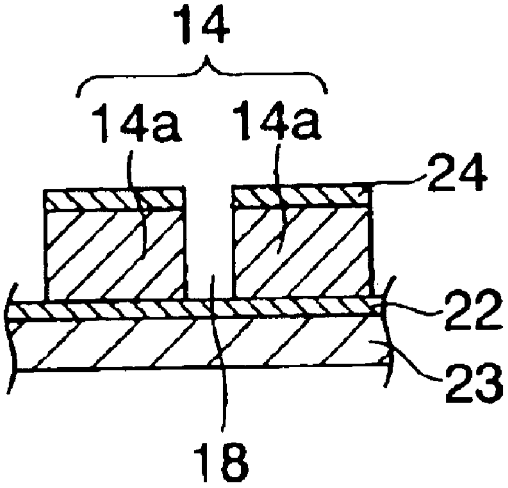

FIGS. 6A and 6B are sectional views showing piezoelectric element array 14 formed by sandblasting. FIG. 6A shows such after sandblasting for a normal period. FIG. 6B shows such after sandblasting for a time interval three times the normal period. With the normal period of sandblasting, isolation trenches 18 having tapered walls are formed between the piezoelectric elements 14*a* as shown in FIG. 6A. On the other hand, when the sandblasting period is tripled, the tapered walls of the isolation trenches 18 of FIG. 6A are changed to form vertical walls as shown in FIG. 6B. This provides suitable isolation between the adjacent piezoelectric elements 14*a*.

In the present embodiment, the piezoelectric plate 21 is temporarily bonded onto the substrate 23 for allowing removal thereof after a sandblasting step to be described later. That is, the substrate damaged by the sandblasting is removed from the piezoelectric elements 14*a*. Consequently, tripling the sandblasting period as described above effects sufficient sandblasting to form the vertical isolation trenches 18 without causing such problems as damage to other constituent members.

Figure 1B:
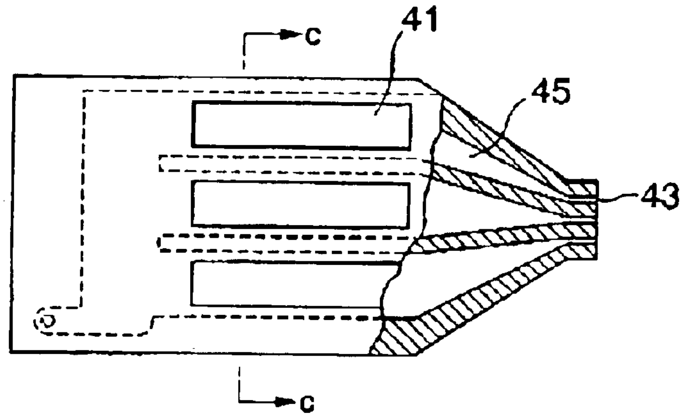
FIG. 1B RELATED ART
Figure 1C:
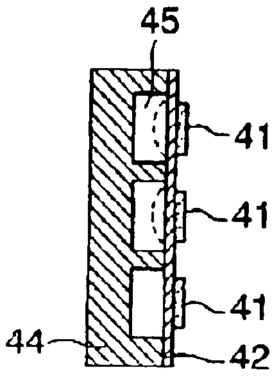
FIG. 1C RELATED ART
Figure 7:
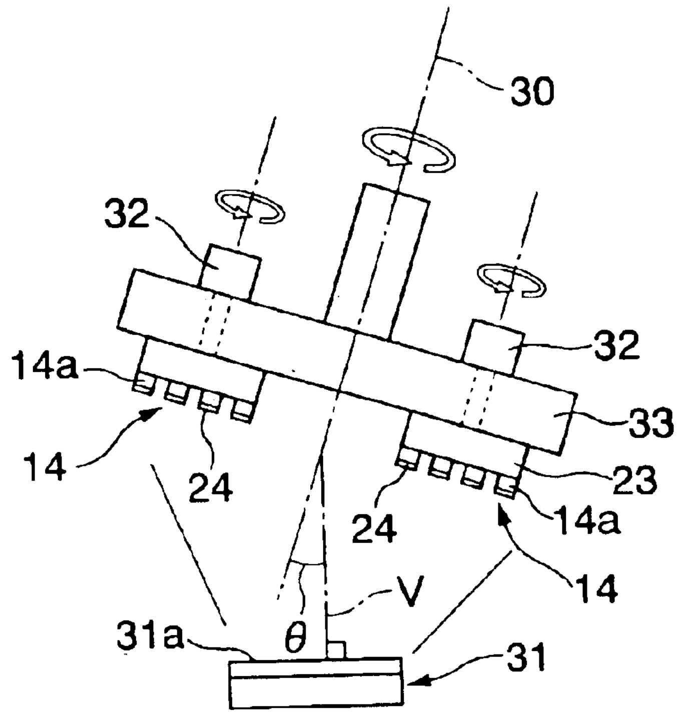
FIG. 7 is a front view showing the insulating resin formed by evaporation on the four sides of the piezoelectric elements in the first embodiment.

FIG. 7 is a front view showing the step of forming the insulating resin film 15 (see FIGS. 1 and 2) on the four sides of the piezoelectric elements 14*a* by evaporation. During the evaporation step, the plurality of piezoelectric elements 14*a* isolated from one other with the isolation trenches 18 can be handled in block as a piezoelectric element array 14.

The evaporation step is conducted between the step of forming the piezoelectric element array 14 and the step of bonding the piezoelectric element array 14 to the diaphragm 13, by using an evaporation system to be described below. The evaporation system includes an evaporation source 31, a disc-like substrate holder 33, and a vacuum chamber (not shown). The evaporation source 31 accommodates evaporation material such as polyamide. The substrate holder 33 mounts thereon substrates 23 onto which piezoelectric element arrays 14 are fixed. The vacuum chamber accommodates therein the evaporation source 31 and the substrate holder 33. The substrate holder 33 rotates about a first shaft

30 which tilts at an angle θ from a vertical line V drawn to an opening 31*a* of the evaporation source 31. The substrate holder 33 has a plurality of second shafts 32 for holding substrates 23 on the tips thereof, the second shafts extending at an equal distance from the first shaft 30.

In the evaporation step, as shown in FIG. 7, the substrates 23 are initially fixed to the tips of the second shafts 32, with the surfaces of the piezoelectric elements 14*a* of the piezoelectric element arrays 14 covered with photosensitive films 24. Then, the interior of the vacuum chamber is kept in a vacuum when the second shafts 32 are rotated in the same direction for rotation and the substrate holder 33 is rotated about the first shaft 30 for revolution. As a result, an insulating resin film 15 is uniformly formed by evaporation on the four sides of the piezoelectric elements 14*a* in the piezoelectric element arrays 14. The formation of this insulating resin film 15 can protect the piezoelectric elements 14*a* against the damage due to dielectric breakdown which may be caused by absorption of moisture from the air, thereby improving the reliability of the piezoelectric elements 14*a*.

Figure 8:
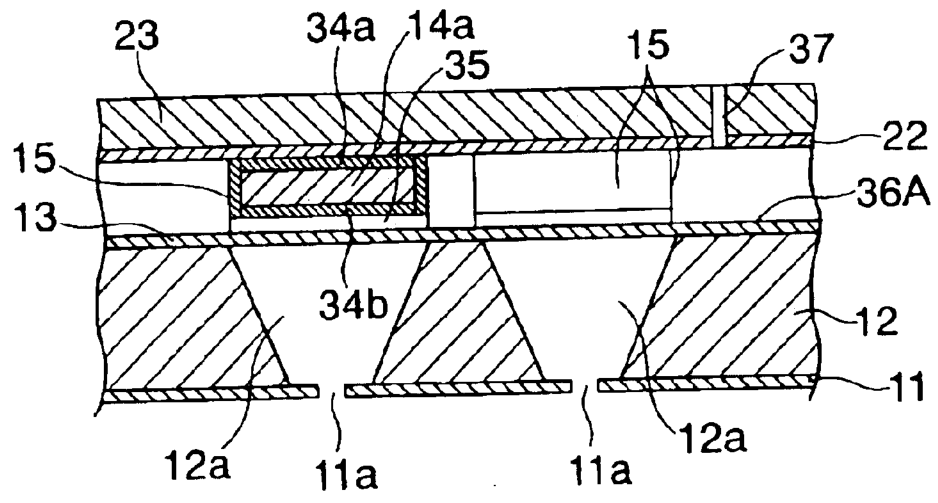
FIG. 8 is a sectional view showing a state in which the square piezoelectric element array of the first embodiment having the insulating resin film is bonded to a diaphragm.

FIG. 8 is a sectional view showing the state in which the piezoelectric element array 14 provided with the insulating resin film 15 is bonded onto a diaphragm 13. In this stage, the pressure chamber plate 12 and the diaphragm 13 are coupled together onto the nozzle plate 11. Then, the sides of the piezoelectric elements 14*a* far from the substrate 23 are coupled to the diaphragm 13 with suitable alignment. It is to be noted that the diaphragm 13 is in advance provided with cross positioning marks 36A, with reference to which the piezoelectric element array 14 and the diaphragm 13 are coupled to each other in this step. The substrate 23 has openings 37 for use in optical positioning with respect to the positioning marks 36A. The openings 37 are formed in the step of the sandblasting.

Subsequently, the positioning marks 36A are optically detected by using an optical microscope through the openings 37 so that the two-dimensional array of piezoelectric elements 14*a* is coupled as a unit onto the diaphragm 13, i.e., walls of the pressure chambers 12*a* with high accuracy. Here, each piezoelectric element 14*a* is provided with the electrode layers, or the first and second electrode layers 34*a* and 34*b*, on both sides thereof by means of a sputtering technique in advance. Thereafter, the second electrode layers 34*b* are bonded and fixed onto the diaphragm 13 with a conductive adhesive 35.

Subsequently, in order to release the substrate 23 from the piezoelectric elements 14*a* that are fixed onto the diaphragm 13, the substrate 23 is heated to reduce the adhesive strength of the heat-foaming adhesive film 22. This significantly facilitates the step of separating the piezoelectric element array 14 from the substrate 23.

Example of First Embodiment

In this example, a plurality of nozzles 11*a* each having a diameter of 30±0.5 micrometers were formed in the nozzle plate 11 in a two-dimensional array of 64 rows×4 columns. With this nozzle plate 11 prepared, a stainless diaphragm 13 was coupled as shown in FIG. 2 so as to close the pressure chambers 12*a* communicating with the respective nozzles 11*a*.

Next, a 30-μm-thick sheet of piezoelectric plate 21 made of lead zirconate titanate was bonded onto the substrate 23 with a heat-foaming adhesive film (for example, REVALPHA™) 22. A urethane-based photosensitive film 24 was then formed on the piezoelectric plate 21 for patterning. This patterning used a pattern mask having a piezoelectric element mask pattern for forming a piezoelectric element pattern 19*a* equivalent to four piezoelectric elements 14*a* and a peripheral dummy mask pattern for forming a peripheral dummy pattern 19*b* surrounding the piezoelectric element pattern 19*a*.

Subsequently, silicon carbide grains (for example, 20 micrometers in grain size) were blasted from above the foregoing pattern mask at a predetermined pressure (for example, 2 kg/cm$^2$) to sandblast the piezoelectric plate 21. The time interval of this processing was set at six seconds, or three times a trench penetrating period (normal processing period) of two seconds by the sandblasting in the thickness direction of the piezoelectric plate 21. As a result, isolation trenches 18, which might have skewed as shown in FIG. 6A if processed for the normal processing period, were rectified in shape into vertical-wall trenches having a sectional shape of 80 micrometers in width.

The resultant piezoelectric elements 14*a* each had a square shape of 500±10 micrometers in side, with a thickness of 30±1 micrometers. In view that sandblasting with no peripheral dummy pattern may cause variances of ±50 micrometers or greater in the width of the peripheral piezoelectric elements, the provision of the peripheral dummy pattern is significantly effective. Moreover, the processing period of the sandblasting is as extremely short as a few seconds even when compared to those of other steps. Thus, tripling the normal period do not substantially degrades the productivity. Although the present embodiment uses the peripheral dummy pattern shown in FIG. 10, the peripheral dummy pattern may have an integral structure.

Next, with the sandblasted piezoelectric element array 14 kept bonded onto the substrate 23, a 10-μm-thick insulating resin film 15 made of polyamide was evaporated on the four sides of the piezoelectric elements 14*a*. As shown in FIG. 7, the evaporation system used herein was such including the evaporation source 31 for accommodating polyamide as the evaporation material and the substrate holder 33 for rotating about the first shaft 30 which tilted at 15° from a vertical line V drawn to the evaporation source 31. The substrate holder 33 had a plurality of second shafts 32 at an equal distance from the first shaft 30.

In the evaporation step, the substrate 23 covered with the photosensitive film 24 was fixed onto the tip of the second shaft 32. The substrate 23 was rotated about the second shaft 32 while the substrate holder 33 was revolved about the first shaft 30, whereby the 10-μm-thick insulating resin film 15 was uniformly formed by evaporation on the sides of the piezoelectric elements 14*a*.

Next, the piezoelectric element array 14 was coupled to the diaphragm 13 at the side far from the heat-foaming adhesive film 22, while being aligned with the positioning marks 36A on the diaphragm 13 through the openings 37 by using an optical microscope. The piezoelectric element array 14 having the 64-row by 4-column array of piezoelectric elements 14*a* was thereby coupled as a unit to the diaphragm 13 with high accuracy of ±15 micrometers or less. Each of the piezoelectric elements 14*a* was previously provided with a 0.2-μm-thick metallic thin film of Cr and a 0.1-μm-thick metallic thin film of Au in succession by means of sputtering on both sides as the electrode layers 34*a* and 34*b*. The electrode layers 34*b* were bonded to the diaphragm 13 with a conducive adhesive or paste 35.

Thereafter, the substrate 23 was heated to reduce the adhesive strength of the heat-foaming adhesive film 22, and the substrate 23 was removed from the piezoelectric elements 14*a*. The piezoelectric elements 14*a* were connected to a control unit (not shown) via solder ball bumps 16 and wiring 17. In the inkjet recording head thus manufactured, each of the piezoelectric elements 14*a* was suitably driven on a drive voltage of 30 volts at a frequency of 30 kHz, thereby successfully ejecting ink droplets from the corresponding nozzles 11*a*.

Second Embodiment

Figure 9:
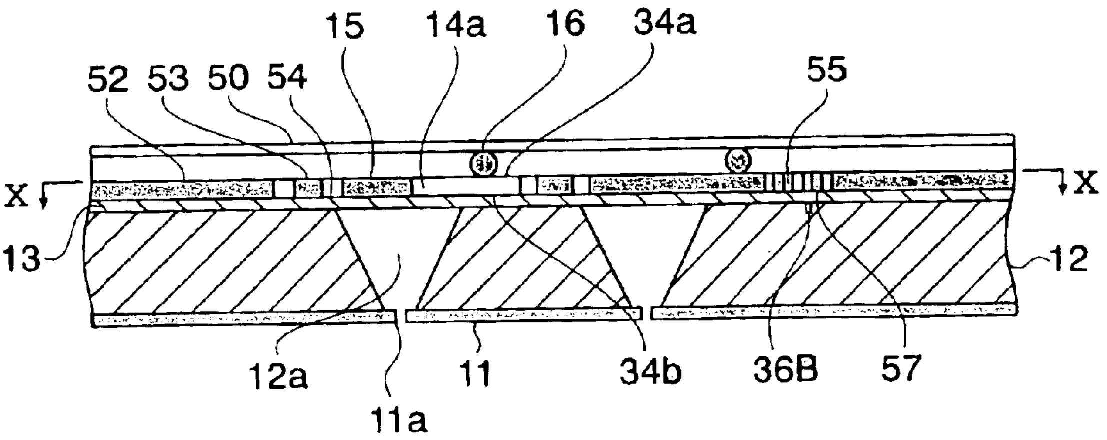
FIG. 9 is a sectional view showing the configuration of the essential parts of an inkjet recording head according to a second embodiment of the present invention.

Now, description will be given of a second embodiment according to the present invention. The present embodiment is directed to an example of the inkjet recording head that includes pressure chambers of square shape and piezoelectric elements having a different, rectangular shape. FIG. 9 is a sectional view showing the configuration of the essential parts of the ink-jet recording head in the present embodiment.

This inkjet recording head has a nozzle plate 11 in which a plurality of nozzles 11*a* are formed in a two dimensional array. On this nozzle plate 11 are arranged a pressure chamber plate 12 and a diaphragm 13. The pressure chamber plate 12 defines therein a plurality of pressure chambers 12*a* each communicating with a corresponding nozzle 11*a*. The diaphragm 13 is bonded so as to close the pressure chambers 12*a*.

A plurality of piezoelectric elements 14*a* are arranged on the other side of the diaphragm 13 far from the pressure chambers 12*a*, in a two-dimensional array so as to oppose the respective pressure chambers 12*a*. Each of the pressure chambers 12*a* has a square opening as viewed from above. The rectangular piezoelectric elements 14*a* are coupled to the diaphragm 13 so that the edges of the rectangular piezoelectric elements 14*a* are positioned above walls of the pressure chambers 12*a*, or on portions of the pressure chamber plate 12.

Each of the piezoelectric elements 14*a* is covered with an insulating resin film 15 at the side surfaces, and is provided with first and second electrode layers 34*a* and 34*b* on the top and bottom surfaces, respectively. The pressure chambers 12*a* have the shape of a substantially quadrangular pyramid, which reduces in size as viewed from the diaphragm 13 toward the nozzles 11*a*. The first electrode layers 34*a* are mechanically and electrically connected to a flexible wiring board 50 via solder ball bumps 16. The second electrode layers 34*b* are bonded to the diaphragm 13 with a conductive adhesive. A drive voltage is applied from a control unit (not shown) to the piezoelectric elements 14*a* through the flexible wiring board 50 and the solder ball bumps 16.

Figure 10:
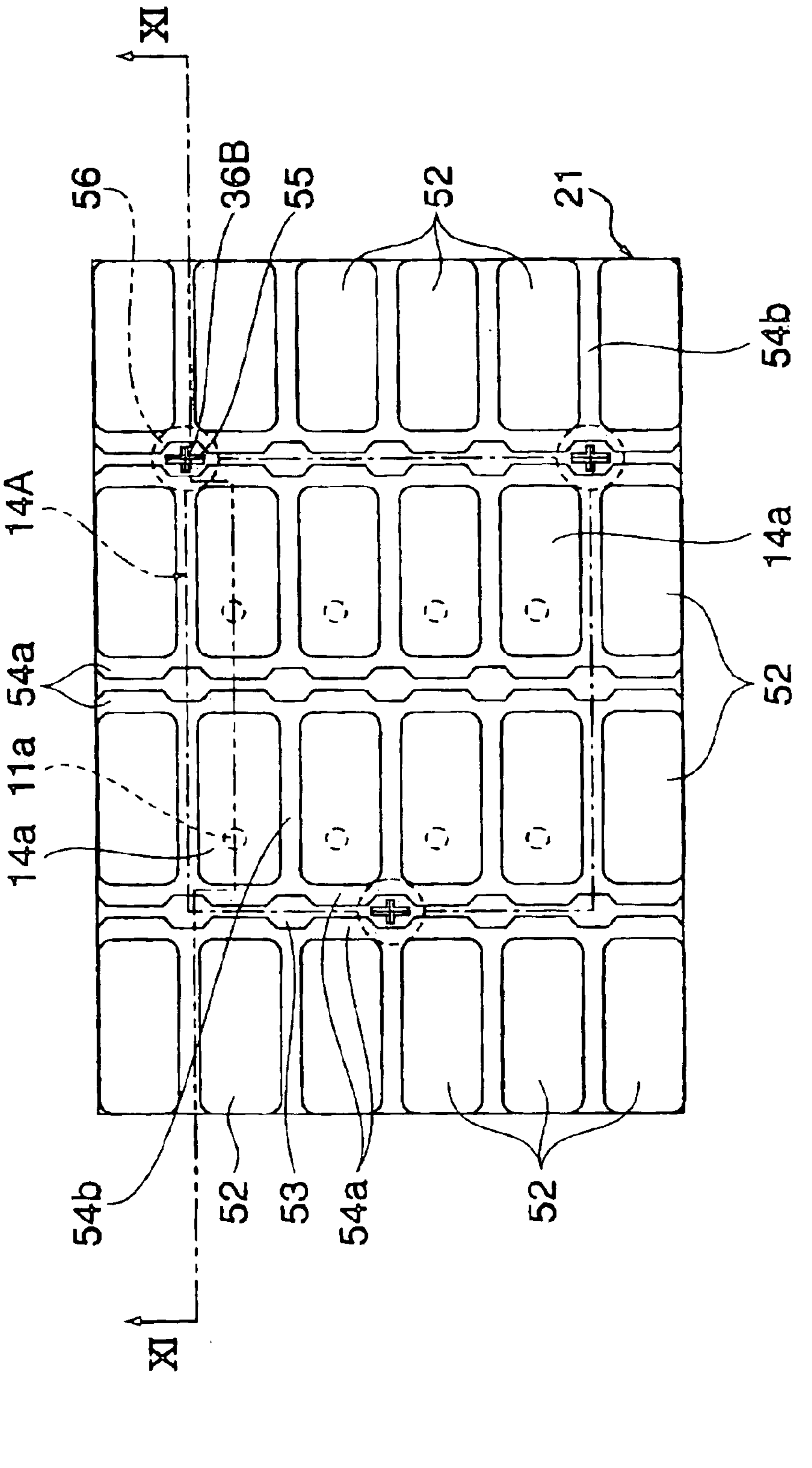
FIG. 10 is a top plan view taken along the line X—X of FIG. 9, showing the physical relationship among pluralities of rectangular piezoelectric elements and nozzles arranged in a two dimensional array, a dummy pattern, and an alignment pattern in the second embodiment.

FIG. 10 is a top plan view taken along the line X—X of FIG. 9, showing the configuration of a piezoelectric element pattern. In the piezoelectric plate 21, the plurality of nozzles 11*a* are arranged in a two-dimensional array over the nozzle plate 11. The plurality of piezoelectric elements 14*a* opposed to these nozzles 11*a* are arranged in a matrix on the diaphragm 13.

Now, description will be given of a manufacturing method for manufacturing the inkjet recording head of the present embodiment. Initially, to produce piezoelectric elements 14*a*, a rectangular sheet of piezoelectric plate 21 is prepared as shown in FIG. 10. A piezoelectric element pattern is formed on the piezoelectric plate 21.

In the pattern forming step, a photosensitive film is first bonded over the entire surface of the piezoelectric plate 21 which is bonded onto a substrate 23. This photosensitive film is covered with a grid mask for exposure and development. The cells of the photosensitive film (not shown) cured and left by the development constitute a pattern mask. The pattern mask includes a piezoelectric element mask pattern for forming a piezoelectric element pattern 14A including eight piezoelectric elements 14*a* and a peripheral dummy mask pattern for forming 16 cells of peripheral dummy pattern 52 which surrounds the piezoelectric element pattern 14A. This pattern mask also includes intervening dummy mask patterns for forming intervening dummy patterns 53.

The intervening dummy pattern 53 are disposed on the boundary between the interior of the piezoelectric element array 14, or the piezoelectric elements, and the peripheral dummy pattern 52 as well as the boundary between each adjacent columns of the piezoelectric elements so that similar isolation trenches 54 are formed in a two-dimension array around the piezoelectric elements 14*a*. The regions not covered under the foregoing pattern mask are removed through sandblasting, thereby obtaining a trench pattern which extends in row and column directions.

The trench pattern as described above includes isolation trenches 54*a* resulting from the presence of the intervening dummy pattern 53 and isolation trenches 54*b* formed independently of the intervening dummy pattern 53. The isolation trenches 54*a* and 54*b*, or gaps between the adjacent piezoelectric elements 14*a*, are all formed in approximately the same width (±20%). The sandblasting process using the pattern mask including such a trench pattern yields a plurality of piezoelectric elements 14*a* and trenches of uniform sections.

Figure 11:
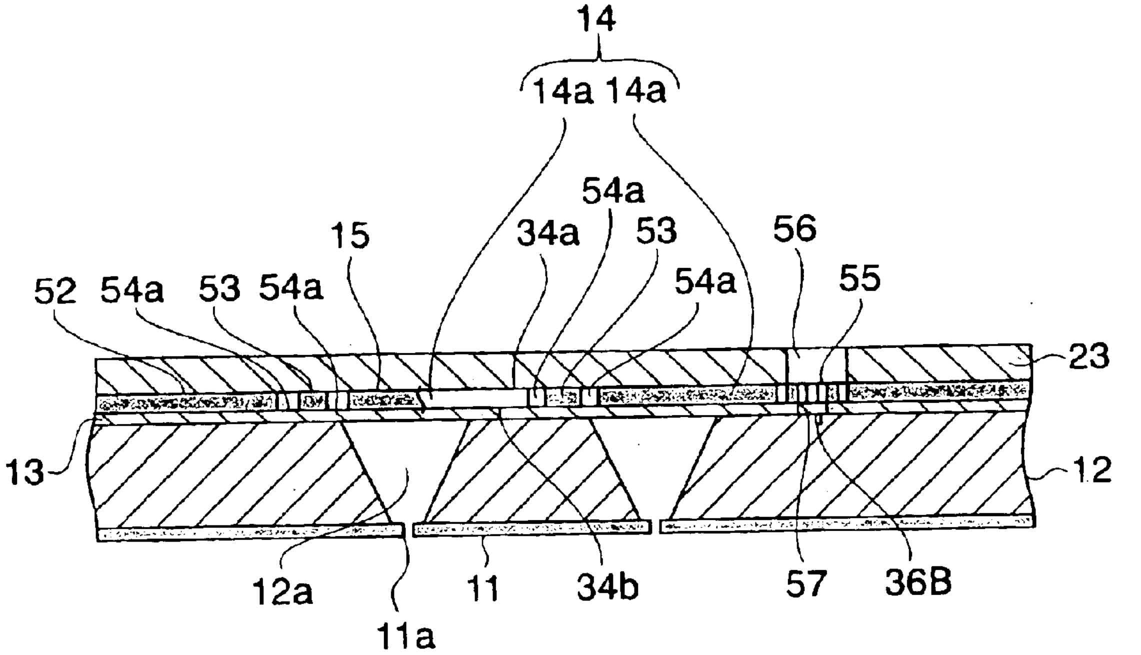
FIG. 11 is a sectional view showing a state in which a rectangular piezoelectric element array of the second embodiment is bonded onto a diaphragm.
Figure 12:
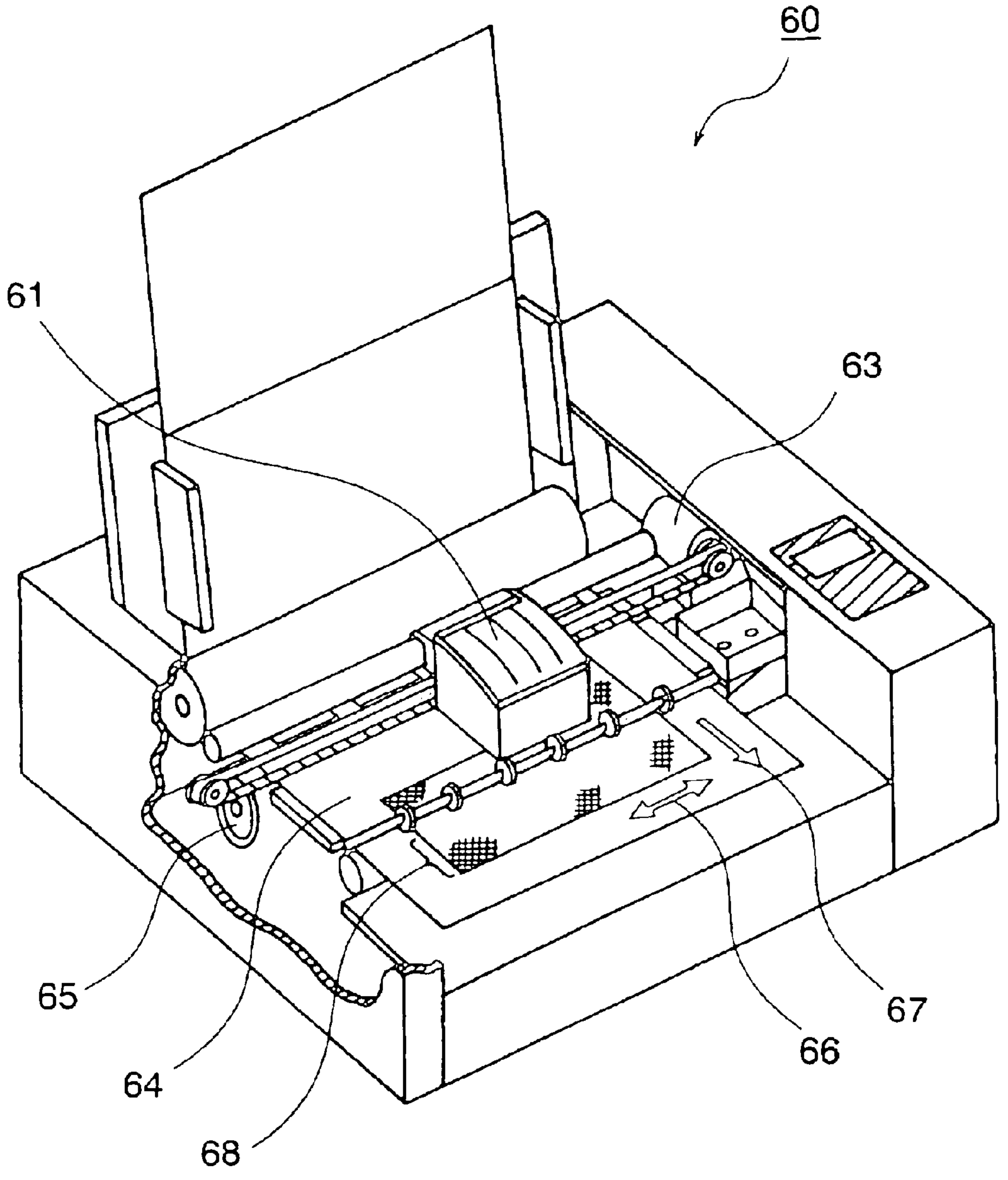
FIG. 12 is a perspective view showing an inkjet recording device according to a third embodiment of the present invention.

FIG. 11 is a sectional view taken along the X—X line of FIG. 10, showing a step before the removal of the substrate 23. After the steps described above, the plurality of piezoelectric elements 14*a* are formed in the piezoelectric element array 14 on the substrate 23. To mount these piezoelectric elements 14*a* above the respective pressure chambers 12*a*, the pressure chamber plate 12 and the diaphragm 13 are bonded onto the nozzle plate 11 in succession. Then, at the sides of the piezoelectric elements 14*a* opposite from the substrate 23 are bonded onto the diaphragm 13 in suitable alignment.

For the alignment, the substrate 23 is provided with through-holes 56 in advance. The piezoelectric plate 21 releasably bonded onto this substrate 23 is subjected to sandblasting to form the piezoelectric element array 14, in which step the isolation trenches 54*a*, 54*b* in FIG. 10 for isolating the piezoelectric elements 14*a* from one another and alignment marks 55 generally consistent with the positions of the through holes 56 are formed simultaneously. Subsequently, with reference to the alignment marks 55, the piezoelectric elements 14*a* inverted 180° in pattern are coupled to the diaphragm 13 on the pressure chamber plate 12, with suitable positioning among the through-holes 56 in the substrate 23, the alignment marks 55, through-holes 57 in the diaphragm 13 which constitutes part of walls of the pressure chambers 12*a*, and positioning marks 36B which are previously formed in the pressure chamber plate 12.

In the alignment, the through-holes 56 greater than the alignment marks 55 are formed in the substrate 23 in accordance with the pitch of the alignment marks 55. Thus, the alignment can be easily performed from the rear side of the substrate 23. Upon the alignment, the positioning marks 36B are optically detected by using an optical microscope through the openings 56 so that the two-dimensional array of piezoelectric elements 14*a* are coupled in block onto the diaphragm 13 (or walls of the pressure chambers 12*a*) with high accuracy. It is to be noted that the through-holes 56 may be omitted if the substrate 23 is a transparent substrate, such as a glass substrate.

Subsequently, the substrate 23 is removed from the piezoelectric elements 14*a* that are fixed onto the diaphragm 13. As in the first embodiment, this removal is conducted after the substrate 23 is heated to reduce the adhesive strength of the heat-foaming adhesive film 22. Consequently, the step of bonding the piezoelectric element array 14 and the substrate 23 and the step of separating the bonded members from each other are both facilitated significantly.

Example of Second Embodiment

In this example, a plurality of nozzles 11*a* each having a diameter of 30 micrometers were formed in a nozzle plate 11 in a two-dimensional array of 64 rows×4 columns. To this nozzle plate 11 prepared, a stainless diaphragm 13 was coupled as shown in FIG. 9 so as to close the pressure chambers 12*a* communicating with the respective nozzles 11*a*.

Next, a 30-$\mu$m-thick sheet of piezoelectric plate 21 made of lead zirconate titanate was bonded onto a substrate 23 with a heat-foaming adhesive film 22. A urethane-based photosensitive film 24 was formed on the piezoelectric plate 21 for patterning. Subsequently, cells of peripheral dummy pattern 52 having shape similar to the shape of the piezoelectric elements were formed surrounding the piezoelectric element pattern 14A. In addition, an intervening dummy pattern 53 was formed in the interior of a piezoelectric element array 14 so that the gaps between the piezoelectric elements 14*a* were identical in size (for example, 80 micrometers).

Subsequently, as in the example of the first embodiment, the piezoelectric plate 21 was subjected to sandblasting. Again, the processing period was six seconds, or three times the normal processing period. Each of the resultant piezoelectric elements 14*a* had a rectangular shape of 450±5 micrometers in short side and 750±5 micrometers in long side, with a thickness of 30±1 micrometers. The pressure chambers 12*a* had a square opening of 500±10 micrometers in side.

Thereafter, with the sandblasted piezoelectric element array 14 kept bonded onto the substrate 23, a 10-$\mu$m-thick insulating resin film 15 made of polyamide was formed by evaporation on the four sides of each of the piezoelectric elements 14*a*. Subsequently, as shown in FIG. 11, the piezoelectric element array 14 was coupled to the diaphragm 13 at the surface piezoelectric element array 14 far from the heat-foaming adhesive film 22 (FIG. 8) while the positioning marks 36B in the pressure chamber plate 12 and the alignment marks 55 in the piezoelectric plate 21 were aligned to each other by observing with an optical microscope via the through holes 56 and the through holes 57 in the diaphragm 13. In this step, the piezoelectric element array 14 having the 64-row by 4-column of piezoelectric elements 14*a* could be coupled as a unit to the diaphragm 13 with high accuracy of ±15 micrometers or lower.

Each of the piezoelectric elements 14*a* was previously provided with a 0.2-$\mu$m-thick metallic thin film of Cr and a 0.1-$\mu$m-thick metallic thin film of Au in succession by means of sputtering on both sides as the electrode layers 34*a* and 34*b*. The electrode layers 34*b* were bonded onto the diaphragm 13 with a conducive paste 35.

Subsequently, the substrate 23 was heated to reduce the adhesive strength of the heat-foaming adhesive film 22 (FIG. 8) before the substrate 23 was removed from the piezoelectric elements 14*a*. The piezoelectric elements 14*a* were connected to a control unit (not shown) via solder ball bumps 16 and a flexible wiring board 50. The inkjet recording head thus manufactured could also provide a similar driving capability as with the ink-jet recording head according to the example of the first embodiment.

As described above, according to the first and second embodiments, the piezoelectric plate 21 bonded onto the substrate 23 is provided with a peripheral dummy pattern surrounding the piezoelectric element array. Because of this patterning, a plurality of piezoelectric elements 14*a* fixed onto the substrate 23 can be handled together as a unit. This significantly facilitates the step of bonding the piezoelectric elements 14*a* onto the diaphragm 13 so as to oppose the respective pressure chambers 12*a*. Consequently, compact inkjet recording heads implementing nozzles 11*a* packaged in a high density matrix can be produced for mass production with high efficiency. This means a reduction in manufacturing costs, thereby providing inexpensive products. Specifically, a nearly 50% reduction in manufacturing costs were achieved as compared to the conventional inkjet recording head having a similar number of nozzles 11*a*.

The first and second embodiments were directed to the examples where the piezoelectric elements 14*a* are square or rectangular in shape. Nevertheless, the piezoelectric elements 14*a* are not limited thereto and may be hexagonal or circular while providing a similar effect. The piezoelectric elements 14*a* are not limited to the matrix arrangement, either. The piezoelectric elements may be arranged in such a two-dimensional array as forms a circular shape on the whole. Moreover, while the insulating resin film 15 is made of polyamide, other materials such as fluoro-resins and silicon resins are also available.

Third Embodiment

FIG. 22 is a perspective view showing an inkjet recording device according to a third embodiment of the present invention. The inkjet recording device 60 of the present embodiment includes a carriage 61, a main scanning mechanism 63, and a sub-scanning mechanism 65. The carriage 61 incorporates an ink-jet recording head according to an embodiment of the present invention. The main scanning mechanism 63 allows the carriage 61 to scan in main scanning directions 66. The sub-scanning mechanism 65 feeds a recording sheet 64, a recording medium, in a direction (sub-scanning direction 67) normal to the main scanning direction.

The inkjet recording head is mounted on the carriage 61 so that the nozzle surface opposes the recording sheet 64. While moved in the main scanning directions 66, the inkjet recording head ejects ink droplets onto the recording sheet 64 to perform recording over a certain stripe area 68. The recording sheet 64 is then fed in the sub-scanning direction 67, and the carriage 61 is moved in the main scanning direction 66 again for recording over the next stripe area. These operations can be repeated a plurality of times to perform image recording on the entire area of the recording sheet 64.

Example of the inkjet recording device 60 of the present embodiment was used for image recording, and evaluated for recording speed and image quality. The inkjet recording head was such having the head structure described in the above second embodiment. Corresponding to four colors of yellow, magenta, cyan, and black, matrix heads having 256 (64 rows×4 columns) ejectors per color were aligned on the carriage 61 so that dots of four colors were overlaid on the recording sheet 64 for full color image recording. As a result, the ink droplets ejected from the ejectors showed volume uniformity of ±3% or better, with output images having excellent image quality. That is, it was shown that since the inkjet recording device 60 of the present embodiment had the piezoelectric elements of extremely high uniformity in shape, characteristic variances between ejectors could be prevented to allow high quality image output.

Although the present embodiment is directed to the example wherein the head is moved by the carriage during the recording, the present invention may be widely applied to apparatuses of other configurations. For example, a linear type head having nozzles arranged across the entire width of a recording medium may be used, in which case the head is fixed and only the recording medium is moved for recording.

Although the present invention is described in conjunction with the preferred first and second embodiments, examples thereof, and third embodiment, the inkjet recording head, the method for manufacturing the same, and the inkjet recording device of the present invention are not limited to the configurations of the foregoing embodiments and examples. It will be understood that inkjet recording heads, methods of manufacturing the same, and inkjet recording devices achieved through various changes and modifications to the configurations of the foregoing embodiments and examples also fall within the scope of the present invention.

For example, in the foregoing first and second embodiments, the piezoelectric plate bonded onto the substrate is subjected to sandblasting to form the piezoelectric element array. Instead, the piezoelectric plate may be sandblasted as bonded onto the diaphragm so that the piezoelectric element array is formed on the diaphragm directly.

In the foregoing first and second embodiments, the nozzles are arranged in a generally grid-like array. However, the nozzle arrangement is not limited to the generally grid-like one. The present invention may be applied even with other two-dimensional arrangements or to a one-dimensional array of pressure chambers.

The foregoing first to third embodiments illustrated the inkjet recording heads and inkjet recording device in which color inks are ejected onto a recording sheet to record characters, images, and the like. As employed in this specification, however, the inkjet recording is not limited to that of characters and images on recording sheets. More specifically, the recording media are not limited to sheets of paper, nor the liquids to be ejected limited to color inks. For example, color inks may be ejected onto polymer films or glass plates to fabricate color filters for displays. Molten solder may be ejected onto substrates to form bumps as used for solder mounting. The present invention is thus applicable to wide droplet ejection systems for industrial use.

As described above, according to the present invention, it is possible to provide a manufacturing method by which a piezoelectric plate can be formed into arbitrary shapes and a high-density, two-dimensional array of a number of piezoelectric elements in a matrix head can be manufactured by simple manufacturing processes, an inkjet recording head manufactured by such a manufacturing method, and an inkjet recording device incorporating such an inkjet recording head.

What is claimed is:

1. A method for manufacturing an inkjet recording head, said inkjet recording head including a plurality of nozzles, a two-dimensional array of a plurality of pressure chambers each communicating with a common ink reservoir and a corresponding one of said nozzles, a diaphragm constituting part of walls of said pressure chambers, and a plurality of piezoelectric elements coupled to said diaphragm so as to correspond to said pressure chambers, said method comprising:

temporarily bonding a piezoelectric plate onto a substrate;

forming a mask having a piezoelectric element array mask pattern on said piezoelectric plate, said piezoelectric element array mask pattern includes a plurality of piezoelectric element mask patterns;

sandblasting said piezoelectric plate through said mask to thereby form a piezoelectric element array including a plurality of separate piezoelectric elements;

bonding said piezoelectric element array onto said diaphragm as a unit; and removing said substrate from said piezoelectric element array after said sandblasting.

2. The method according to claim 1, wherein said mask additionally includes a peripheral dummy mask pattern surrounding said piezoelectric element array mask pattern and/or an intervening dummy mask pattern having a portion disposed between adjacent two of said piezoelectric element mask patterns.

3. The method according to claim 1, wherein said sandblasting additionally forms a positioning mark on said substrate and/or said piezoelectric plate.

4. The method according to claim 1, wherein:

said temporarily bonding uses a heat-foaming adhesive film; and, said removing includes heating said heat-foaming adhesive film.

5. The method according to claim 1, further comprising forming an insulating resin film on side surfaces of said piezoelectric elements between said sandblasting and said piezoelectric elements bonding.

6. The method according to claim 1, wherein said piezoelectric elements bonding uses a conductive adhesive.

7. The method according to claim 1, wherein said sandblasting is conducted for a time interval longer than a minimum normal processing period for penetrating said piezoelectric plate.

8. The method according to claim 1, wherein said sandblasting forms a plurality of trenches between adjacent remaining portions of said piezoelectric plates, said trenches having a substantially uniform width.

9. The method according to claim 1, wherein one of opposite edges of said piezoelectric element opposes a wall of said pressure chamber and the other of said opposite edges of said piezoelectric element opposes an interior of said pressure chamber.

10. The method according to claim 9, further comprising mechanically and electrically connecting a flexible wiring board to surfaces of said piezoelectric elements by using solder bumps.

11. A method for manufacturing an inkjet recording head, said inkjet recording bead including a plurality of nozzles, a two-dimensional array of a plurality of pressure chambers each communicating with a common ink reservoir and a corresponding one of said nozzles, a diaphragm constituting part of walls of said pressure chambers, and a plurality of piezoelectric elements coupled to said diaphragm so as to correspond to said pressure chambers, said method comprising:

forming a mask having a mask pattern on a piezoelectric plate, said mask pattern including a piezoelectric element array mask pattern and a dummy mask pattern, said piezoelectric element array mask pattern including a plurality of piezoelectric element mask patterns; and sandblasting said piezoelectric plate through said mask to thereby form a piezoelectric element array including a plurality of separate piezoelectric elements and at least one dummy pattern, said dummy pattern having an edge extending adjacent to an edge of one of said piezoelectric elements.

12. The method according to claim 11, wherein said dummy mask pattern includes a peripheral mask pattern surrounding said piezoelectric element array mask pattern.

13. The method according to claim 11, wherein said dummy mask pattern includes a plurality of dummy mask patterns each having a portion disposed between two of said piezoelectric element mask patterns.

14. The method according to claim 11, further comprising:

temporarily bonding said piezoelectric plate onto a substrate before said sandblasting step;

bonding said piezoelectric element array as a unit onto said diaphragm; and removing said substrate from said piezoelectric element array after said sandblasting.

15. The method according to claim 14, wherein said sandblasting additionally forms a positioning mark on said substrate and/or said piezoelectric plate.

16. The method according to claim 14, wherein:

said temporarily bonding uses a heat-foaming adhesive film; and, said removing includes heating said heat-foaming adhesive film.

17. The method according to claim 14, further comprising forming an insulating resin film on side surfaces of said piezoelectric elements between said sandblasting and said piezoelectric elements bonding.

18. The method according to claim 14, wherein said piezoelectric elements bonding uses a conductive adhesive.

19. The method according to claim 14, wherein said sandblasting is conducted for a time interval longer than a minimum normal processing period for penetrating said piezoelectric plate.

20. The method according to claim 14, wherein said sandblasting forms trenches between adjacent remaining portions of said piezoelectric plate, said trenches having a substantially uniform width.

21. The method according to claim 14, wherein one of opposite edges of said piezoelectric element opposes a wall of said pressure chamber and the other of said opposite edges of said piezoelectric element opposes an interior of said pressure chamber.

22. The method according to claim 21, further comprising mechanically and electrically connecting a flexible wiring board to surfaces of said piezoelectric elements by using solder bumps.

* * * * *